May 17, 1927.
S. E. LARSON
1,629,346
GASKET FOR FRUIT JARS
Filed July 20, 1926
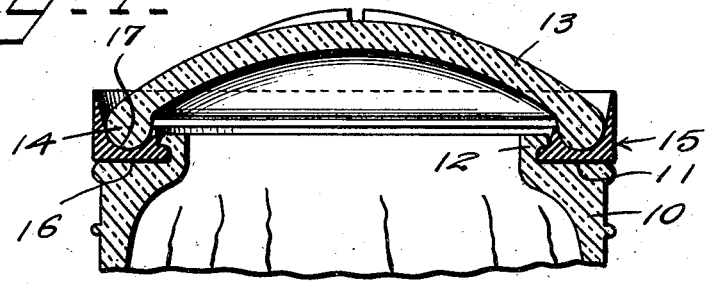
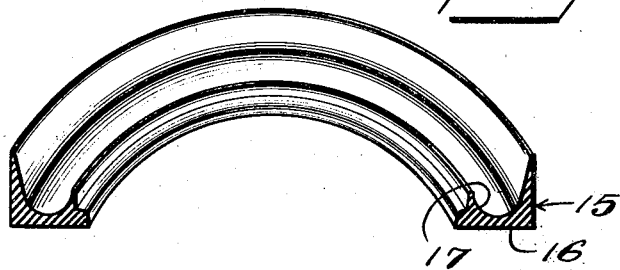
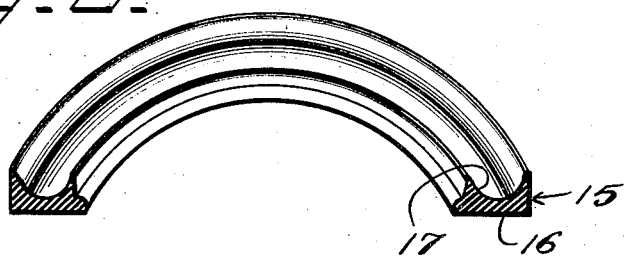
Inventor
S. E. Larson
By Horace C. Chandler
Attorney Patented May 17, 1927.

1,629,346

UNITED STATES PATENT OFFICE.

SAMUEL E. LARSON, OF CUSTER COUNTY, NEBRASKA.

GASKET FOR FRUIT JARS.

Application filed July 20, 1926. Serial No. 123,735.

This invention relates to new and useful improvements in sealing devices, and particularly to gaskets for use in connection with glass fruit jars.

One object of the invention is to provide a device of this character which will form a more effective seal, between the cover of the jar and the lip or mouth thereof.

Another object is to provide a gasket which permits a more perfect and wider surface contact with the cover and mouth of the jar.

Other objects and advantages will be apparent from the following description when taken in connection with the accompanying drawing.

In the drawing:

Figure 1 is a sectional detail view showing the use of the gasket.

Figure 2 is a sectional perspective view of the gasket removed from the jar.

Figure 3 is a view similar to Figure 2, showing a modification of the gasket.

Referring particularly to the accompanying drawing, 10 represents the neck portion of a common fruit jar, having the mouth provided with the horizontal ledge 11, and the vertical flange 12, at the inner edge of the ledge. The cover, or lid 13, is concavo-convex, and has on its concave face, adjacent the periphery thereof, a rounded rib or shoulder 14.

Seated on the ledge 11 is the gasket, represented as a whole by the numeral 15, said gasket being formed of soft rubber and having a flat face 16 which rests on the ledge 11. In the upper face of the rubber gasket or ring 15, there is formed a circular groove 17, of a cross sectional contour to snugly receive the rounded rib or shoulder 14, of the cover. It will be noted that the outer wall of the groove is of greater height than the inner wall, and that such outer wall projects a short distance above the adjacent portion of the periphery of the cover, whereby to cooperate with said periphery to form a groove or channel in which paraffin, or the like sealing material may be poured, after the cover has been properly clamped on the gasket and jar. Thus a greater contactual area is produced between the cover and the gasket, by the provision of the rib 14, and the particular groove of the gasket, with the result that a more effective seal is made between the cover and the jar mouth. Of course, the sealing effectiveness of the gasket, between the cover and mouth of the jar is practically as great without the paraffin, as with the same. However, the use of the sealing material is within the desires of the user.

In Figure 3, there is shown a modification of the gasket, wherein the inner and outer walls of the groove of the gasket are of approximately the same height, it being noted that the outer wall does not extend above the periphery of the cover, as in the first form. This latter form is the one which is more commonly used, when the paraffin, or sealing material are omitted.

What is claimed is:

1. The combination with a jar having a horizontal ledge on the mouth thereof and a cover having a depending peripheral flange, of a gasket having a lower flat face seated on the ledge and an upper peripherally grooved face receiving said flange, one wall of said groove being higher than the other wall, whereby to project above the periphery of said cover and cooperate with the latter to form a groove to receive a sealing material.

2. The combination with a jar having a horizontal ledge on the mouth thereof and a peripherally grooved flange extending vertically from the inner edge of the ledge, and a cover having a depending flange formed with a bead, of a gasket having a flat bottom face, vertical walls at the inner and outer sides of the gasket defining a circular groove in the upper face of the gasket for the reception of said bead, said bottom face being arranged to rest on said ledge, the gasket having means engaged in the groove of the vertical flange of the jar.

3. The combination with a jar having a mouth formed with a flat ledge and an inner vertical flange formed with a peripheral groove, and a cover having a depending peripheral flange formed with a bead, of a gasket having a flat bottom face resting on said ledge outwardly of the jar flange, a pair of vertical walls rising from the inner and outer edges of the gasket defining an intermediate circular groove, said groove receiving said bead of the cover, and a rib on the inner face of the gasket received in the groove of the flange of the jar mouth.

In testimony whereof I affix my signature.

SAMUEL E. LARSON.